March 21, 1967  W. E. WINSCHE  3,310,473

SPECTRAL SHIFT REACTOR CONTROL

Filed Jan. 21, 1966

INVENTOR.
WARREN E. WINSCHE
BY 3,310,473
SPECTRAL SHIFT REACTOR CONTROL
Warren E. Winsche, Bellport, N.Y., assignor to the United States of America as represented by the United States Atomic Energy Commission
Filed Jan. 21, 1966, Ser. No. 522,333
2 Claims. (Cl. 176—20)

The invention described herein was made in the course of, or under, a contract with the U.S. Atomic Energy Commission.

The present invention relates to the control of a fast nuclear fission reactor exercised by regulating the neutron cross-section spectrum of the coolant.

In a nuclear reactor of common design, control is exercised over the output of the reactor by varying the amount of neutron poisons present in the core at any one particular time. Generally, control rods perform this function by being adjustably positioned in and with respect to the core.

One of the disadvantages associated with poison rod sections in control of reactor operation is that substantial inefficiencies result from their use. Poison sections of control rods cause the formation of power depressions throughout the core which require the provision of excessive amounts of reactivity to permit this control to be exercised. As a further consequence of such an arrangement, the fuel must be replaced with fresh fuel long before maximum theoretical burnup is obtained to permit the exercise of control during the whole period of operation. Hence, the core requires at the outset a large excess of reactivity while the usefulness of the core is gone much sooner because of the presence of the poison rod sections. Other disadvantages associated with the use of control rods have to do with flux perturbations resulting in non-uniform power generation throughout the core and the problems sometimes imposed by sticking control rods or the possibility that sticking might occur.

As a result of the aformentioned disadvantages, there has been proposed for the thermal, water-cooled reactor, a spectral shift control in which the moderating fluid, which also acts as coolant, is altered during operation to effect a change in its moderating characteristics. Thus, it has been suggested that a mixture of heavy water and light water can be used and the ratio of one to the other can be used to effect relatively long term reactivity control over the reactor.

Recent advances in the nuclear reactor art have brought forth reactor concept in which liquid metal cooled fast reactors have breeder capability and this may represent the next major forward step in reactor technology. As fast reactors ordinarily do not utilize moderating materials to any significant extent for influencing or causing reactivity within the core, it does not appear initially, at least, that the concept of spectral shift control is applicable to this reactor to overcome the limitations imposed by the presence of poison rod sections for the purpose of reactor control.

A typical fast reactor which has been proposed is one in which liquid sodium acts as the coolant, as for example that shown in U.S. Patent No. 3,140,235, issued to Hatch et al. Liquid metal sodium has excellent heat transfer characteristics and has little moderating effect on the fast neutrons, as well as other desirable characteristics which make it suitable for fast reactor use. However, as in other nuclear fission reactors, in order to extend the life of each core loading and to permit the necessary short and long term reactor control, it is necessary to provide poison rods to soak up those neutrons which are in excess at any given time.

A fast reactor with breeder capability contains both fertile and fissionable material. During the course of reactor operation the ratio of these materials to each other may change as the fissionable material becomes used up and the fertile material is converted into fissionable material. As a result there will be a change in reactivity of the reactor. If the ratio of capture in the fertile material to fission in the fissionable material is somehow properly adjusted to these new conditions, the reactivity can be maintained constant by increasing or decreasing the relative absorption in the fertile material. Thus, instead of the excess neutrons being absorbed in the poison of a control rod, they can be usefully absorbed in accordance with the amounts needed to maintain criticality. For each stage through which the reactor proceeds on exposure, the optimum neutron spectrum can be provided for maximum use of fertile and fissionable material.

It is thus readily apparent that such a spectral control of high temperature, liquid metal cooled nuclear reactors, if feasible, is an attractive possibility for improved neutron economy and simplified reactor control.

The present invention makes it possible for the first time to adapt the principle of spectral shift control to that of a liquid metal cooled fast fission reactor. In accordance with this invention, small amounts of a suitable material are dissolved in the liquid metal so that the neutron cross-section of the coolant can be altered to effect desired changes in the reactivity of the core. In a preferred embodiment of the invention, where sodium is used as the liquid coolant, small, but variable, amounts of lithium are dissolved in the sodium so that the coolant's effect on the neutrons is altered to cause a change in reactivity. The amount of lithium present in the sodium is effectively regulated to obtain the exact amount of the right kind of neutron moderation or absorption characteristics which are required at any given time. Apparatus is utilized in which the relative amounts of sodium and lithium in solution are controlled in a manner made possible by the lithium sodium phase system.

This type of control provides greater uniformity as well in distributing the reactivity controlling material throughout the reactor core. This reduces the requirement for control rods and their channels, thereby affording greater flexibility and freedom in the design of compact reactors. As poison sections of control rods cause general power perturbations, as previously mentioned, the reduction in the number of rods coupled with full power operation of the reactor with most of the remaining rods withdrawn from the core brings about a more efficient and thus economic utilization of the fuel. Reduced power perturbations allow the average fuel burnup to approach more closely the maximum allowable, with a corresponding increase in core life, and the improved power distribution also results in a higher density for a given core size. Thus this control would be especially useful in reactor applications for central station power production from very large, sodium cooled fast and thermal breeder reactors. A further advantage of this invention is in substituting concentration control of reactivity for the bulk of the complex mechanical and electrical controls which will result in simpler and more reliable control with reduced maintenance and likelihood of failure. This is of paramount importance in remotely operated reactors, such as those for space applications, which must operate unattended for long periods of time.

It is thus a first object of this invention to provide for the spectral control of a fast nuclear fission reactor.

Still another object is to provide for the spectral control of a liquid metal cooled fast neutron fission reactor.

Another object of the invention is to provide for the control of a nuclear fission reactor without establishing excessive perturbations in neutron flux.

A further object of this invention is to regulate the neutron cross-section of a liquid metal.

Other objects and advantages of this invention will hereinafter become more readily apparent from the following description of a preferred embodiment of this invention taken with the accompanying drawings in which.

Figure 1:
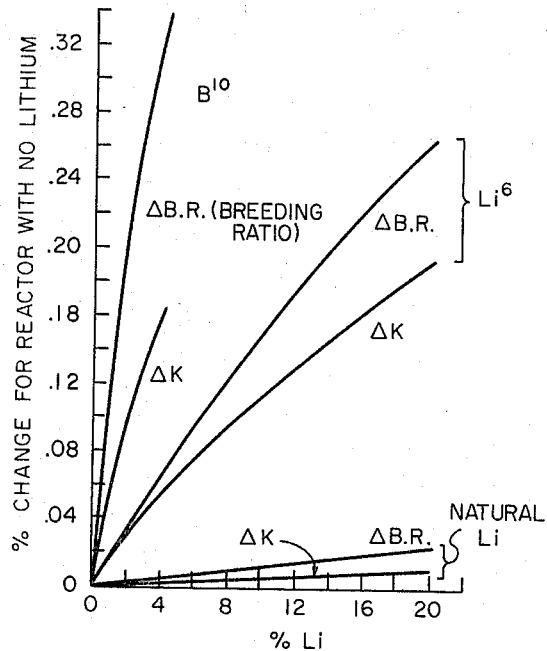
FIG. 1 is a graph illustrating the reactivity and breeding effects of lithium in a liquid sodium cooled fast neutron reactor.

In accordance with a preferred embodiment of this invention, a sodium cooled fast neutron reactor is provided with controlled amounts of lithium dissolved in the sodium to alter the neutron cross section of the coolant. The effectiveness of such a control is illustrated in the chart of FIG. 1 showing lithium content in sodium versus change in reactivity and change in breeding ratio. It will be seen that the addition of lithium decreases the reactivity of the system due to softening of the spectrum by the increased moderating power of the low atomic weight lithium plus the increased absorptions in the $Li^6$ isotope which makes up about 7% of the naturally occurring lithium. For purposes of comparison, the effect of using boron 10 instead of lithium to exercise such control is shown by curves designated $\Delta B.R.$ and $\Delta K$ for boron 10. It will be noted that these curves are almost vertical thereby indicating that close regulation would be more difficult than using lithium, aside from any other considerations.

The effect of the sodium on the neutrons emitted in the fission process varies with the energy levels of the neutrons making up the neutron flux. This effect can be divided into inelastic scattering of neutrons, elastic scattering of neutrons, and absorption of neutrons, among other specific types of effects which have come to be recognized. These effects are measured in terms of cross section which is a measure of the probability that a particular event will occur. With the addition of the lithium, the effective cross section of the sodium is altered in these particular areas which have been mentioned. That is, for example, in a particular energy range of neutrons addition of lithium may cause a reduction in the inelastic scattering cross section and an increase in the elastic scattering cross section with the result that the reactivity of the reactor will be altered slightly.

Figure 3:
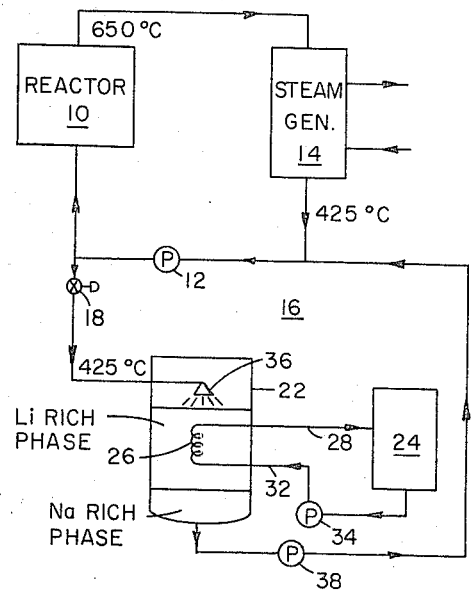
FIG. 3 is a typical flow schematic in block form showing how the principles of this invention are applicable to the control of a nuclear fission reactor.
Figure 2:
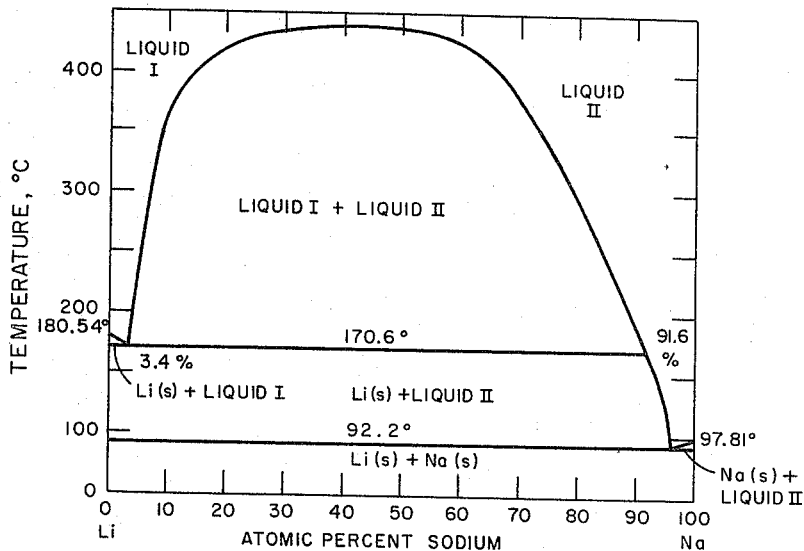
FIG. 2 is the phase diagram for the sodium lithium binary system.

In order to show how it is possible to regulate and select the lithium concentration in the sodium passing through reactor 10, reference is made to FIGS. 2 and 3. FIG. 2 shows the sodium-lithium phase diagram which has been taken from the volume entitled "Handling and Uses of the Alkali Metals" published by the American Chemical Society, 1957.

In FIG. 3 there is illustrated a nuclear reactor 10 utilizing liquid metal sodium as a coolant, which is pumped through reactor 10 by way of pump 12. The heated sodium gives up its heat in heat exchanger 14 which, of course, can be a steam generator or any other suitable user of heat.

In order to regulate the amount of lithium dissolved in the sodium as a means of reactivity control in reactor 10, a variable flow sidestream or by-pass system 16 is provided consisting of a valve 18 to permit the withdrawal of feed sodium being supplied by pump 12 to reactor 10, a condenser 22 which is described herein as an equilibrator, and a cooler 24. Equilibrator 22 is provided with a heat exchange coil 26 connected by access lines 28 and 32 to cooler 24. A pump 34 circulates liquid from cooler 24 through coil 26. Cooler 24 may be any type of unit in which the heat extracted from equilibrator can be rejected, and thus may be water cooled. The by-passed sodium passing through valve 18 is fed to a distributor 36 which sprays the sodium into equilibrator 22. From the bottom of the latter a pump 38 returns the liquid on the bottom to the main stream of sodium leaving heat exchanger 14 and being returned by way of pump 12 to reactor 10. Cooler 24 would be provided with suitable coolant flow controls and thereby regulate the temperature of the coolant being circulated by pump 34 through coil 26.

The use of the apparatus in FIG. 3 to vary the lithium concentration in sodium is illustrated in the following example. The temperatures of 425° C. inlet and 650° C. outlet for reactor 10 are typical values.

Assume that the composition of the reactor coolant is to be varied in the range from 10 a/o Li and 90 a/o Na to 20 a/o Li and 80 a/o Na. Equilibrator 22 contains a volume of Li-rich phase whose temperature is to be controlled between 180° C. and 300° C. and a Na-rich phase as illustrated. In the illustration given, this control of temperature is obtained by regulating the operation of cooler 24 so that coolant flow in heat exchange coil 26 will establish the temperature desired in equilibrator 22. As the temperature of the liquid metal coolant from the main cooling loop is always higher than the temperature within equilibrator 22, temperature control therein is exercised only by controlling the amount of heat taken out.

The reactor coolant, in settling through the Li-rich phase, is brought into thermal and concentration equilibrium with this phase. The liquid collecting in the bottom region of equilibrator 22 is then at a composition corresponding to the temperature of the phase diagram. This composition may be made higher or lower than the composition of the reactor coolant at any time by raising or lowering the temperature within equilibrator 22. The liquid collected at the bottom of equilibrator 22 is returned to the main coolant stream by pump 38. If this system is run for a suitable period of time the composition of the reactor coolant will become nearly equal to that of the Na-rich phase in equilibrator 22. The rate of change of the composition of the reactor coolant can be regulated by varying the setting of valve 18 which controls the rate at which the reactor coolant is treated in equilibrator 22.

The amount of the Li-rich phase in equilibrator 22 will vary with the composition of the reactor coolant. When the reactor coolant is at the upper range of a/o Li, the Li-rich phase in equilibrator 22 will be a minimum and the unit should be designed so that this minimum amount will be sufficient to cover heat exchanger coil 26 and of sufficient depth to allow reasonable attainment of thermal and concentration equilibrium for the coolant being introduced through distributor 36. Similarly in the lower range of a/o Li in the reactor coolant, the volume Li-rich phase will be a maximum, and equilibrator 22 must be large enough to contain this volume with sufficient space for the Na-rich phase.

The foregoing description indicates the general method of control of a/o Li in the reactor coolant where relatively slow rates of change are required. It is sometimes of value to reduce the reactivity of a reactor rapidly. This can be accomplished with this system by the following means. Valve 18 admitting coolant to equilibrator 22 is turned off and return pump 38 is operated at a maximum rate. The Na-rich phase is first withdrawn from equilibrator 22 and introduced into the return coolant stream, after which the Li-rich phase is introduced directly into the coolant. If this is done at such a rate that the coolant temperature is not reduced to 300° C. (in the present example) the Li-rich phase will be completely miscible with the coolant and will rapidly raise the a/o of Li in the coolant to the maximum value.

Obviously, operation of cooler 24 can be automatically controlled by the temperature of the reactor coolant either to establish a maximum outlet temperature from the reactor, or to maintain a desired temperature from the steam generator. Similarly, valve 18 and operation of return pump 38 can be controlled from the reactor coolant temperatures or their rate of change with time.

It is thus seen that there has been provided an improved control over the reactivity and breeding ratio of a fast nuclear fission reactor utilizing a liquid metal coolant. While only a preferred embodiment of the invention has been described, it is understood that many variations thereof may be made without departing from the principles of this invention which is defined and limited only by the scope of the appended claims.

I claim:
1. A spectral shift control for a liquid metal cooled fast neutron reactor comprising:
   (a) means for pumping liquid sodium containing lithium in solution through said reactor;
   (b) means for by-passing a portion of said sodium outside of said reactor;
   (c) equilibrator means for selectively increasing and decreasing the amount of lithium in solution in the bypassed portion of sodium to effect a desired change in reactor reactivity; and
   (d) means for recombining the bypassed portion of sodium with the sodium mainstream prior to entering said reactor;
   (e) said equilibrator means including means for maintaining separate lithium rich and sodium rich phases of sodium-lithium mixtures by regulating the temperature within said equilibrator means, the latter temperature determining the particular compositions of the lithium rich and sodium rich mixtures.

2. The arrangement of claim 1 in which the mixture returned to the mainstream is normally taken from the sodium rich mixture.

References Cited by the Examiner
UNITED STATES PATENTS
3,193,467 7/1965 Evans _____ 176—22
3,239,423 3/1966 Cooper _____ 176—42

FOREIGN PATENTS
1,065,949 9/1959 Germany.
799,001 7/1958 Great Britain.
803,701 10/1958 Great Britain.

OTHER REFERENCES
AEC-Document BNL 799(S–64), 1963, page 11.
AEC-Document BNL 823(S–65), 1963, pages 12–13.
AEC-Document GEAP–3888, 1961, pages 3–10 and 112.

CARL D. QUARFORTH, *Primary Examiner.*

L. DEWAYNE RUTLEDGE, *Examiner.*

H. E. BEHREND, *Assistant Examiner.*